United States Patent [19]
Thies

[11] 3,917,651
[45] Nov. 4, 1975

[54] DIOXATRICYCLODECANONES
[75] Inventor: Peter Willibrord Thies, Hannover, Germany
[73] Assignee: Kali-Chemie AG, Hannover, Germany
[22] Filed: Jan. 24, 1974
[21] Appl. No.: 436,382

Primary Examiner—Anton H. Sutto
Assistant Examiner—Michael Shippen
Attorney, Agent, or Firm—Michael S. Striker

[57] ABSTRACT 2,9-Dioxatricyclo(4.3.1.0$^{3,7}$)decan-4-ones having the formulae

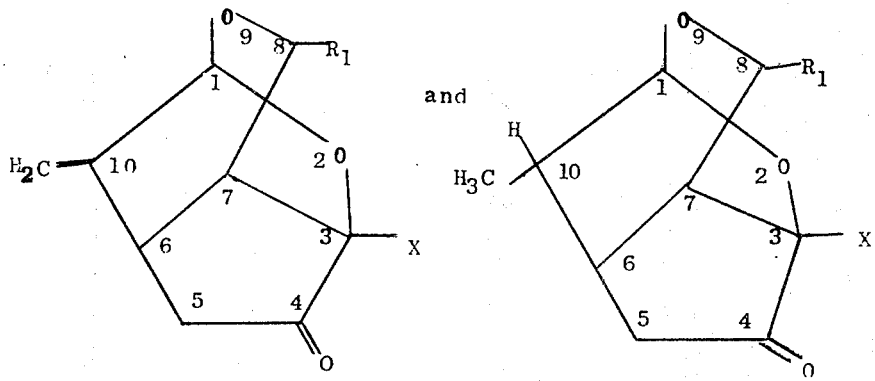

Related U.S. Application Data
[62] Division of Ser. No. 97,420, Dec. 7, 1970, Pat. No. 3,812,154.

[30] Foreign Application Priority Data
Dec. 8, 1969 Germany............................ 1961433
Dec. 13, 1969 Germany............................ 1962624
June 6, 1970 Germany............................ 2027890

[52] U.S. Cl. ............................................. 260/340.3
[51] Int. Cl.$^2$ ........................................ C07D 319/08
[58] Field of Search ............................... 260/340.3 in each of which formulae $R_1$ is a benzyloxy or an alkoxy radical having up to 4 carbon atoms and X is a methyl or chloromethyl radical.

The compounds are hypotensive and centrally depressant and analgetic agents and are useful for treating arteriosclerotic diseases and as psychopharmaceuticals.

7 Claims, 3 Drawing Figures

DIOXATRICYCLODECANONES

CROSS REFERENCE TO RELATED APPLICATION:

This application is a division of my application Ser. No. 97,420, filed Dec. 7, 1970, which matured to U.S. Pat. No. 3,812,154, granted May 21, 1974.

SUMMARY OF THE INVENTION

The invention resides in a bridge-linked ring system 2,9-dioxatricyclo-(4,3,1,0,$^{3,7}$)-decane of the formula Ia and Ib

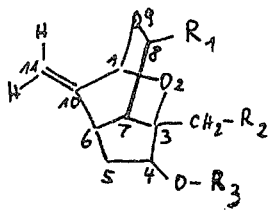
Ia

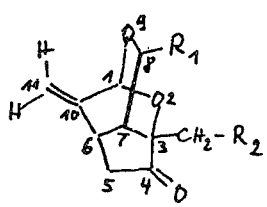
Ib in which $R_1$ is alkoxy or aralkoxy, $R_2$ is hydrogen, halogen or -SCN, $R_3$ is hydrogen or acyl, and the 10,11-double bond may also be hydrogenated.

The compounds are hypotensive and centrally depressant and analgetic agents and are useful for treating arteriosclerotic diseases and as psychopharmaceuticals.

The invention also embraces a process for making the above compounds. For instance the compounds may be made by reacting a cyclopenta(c)-pyran of the formula II

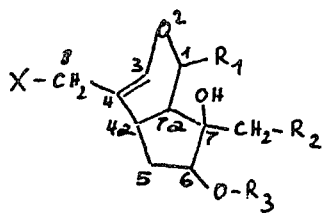
II with an alcohol in an acid medium, X in the above formula being a group that can be eliminated during the reaction such as an acyloxy radical, $R_1$ being acyloxy or a β-D-glucosido group, $R_2$ being halogen, hydrogen or -SCN and $R_3$ being hydrogen or acyl.

The reaction preferably is carried out at 0° – 80°C.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
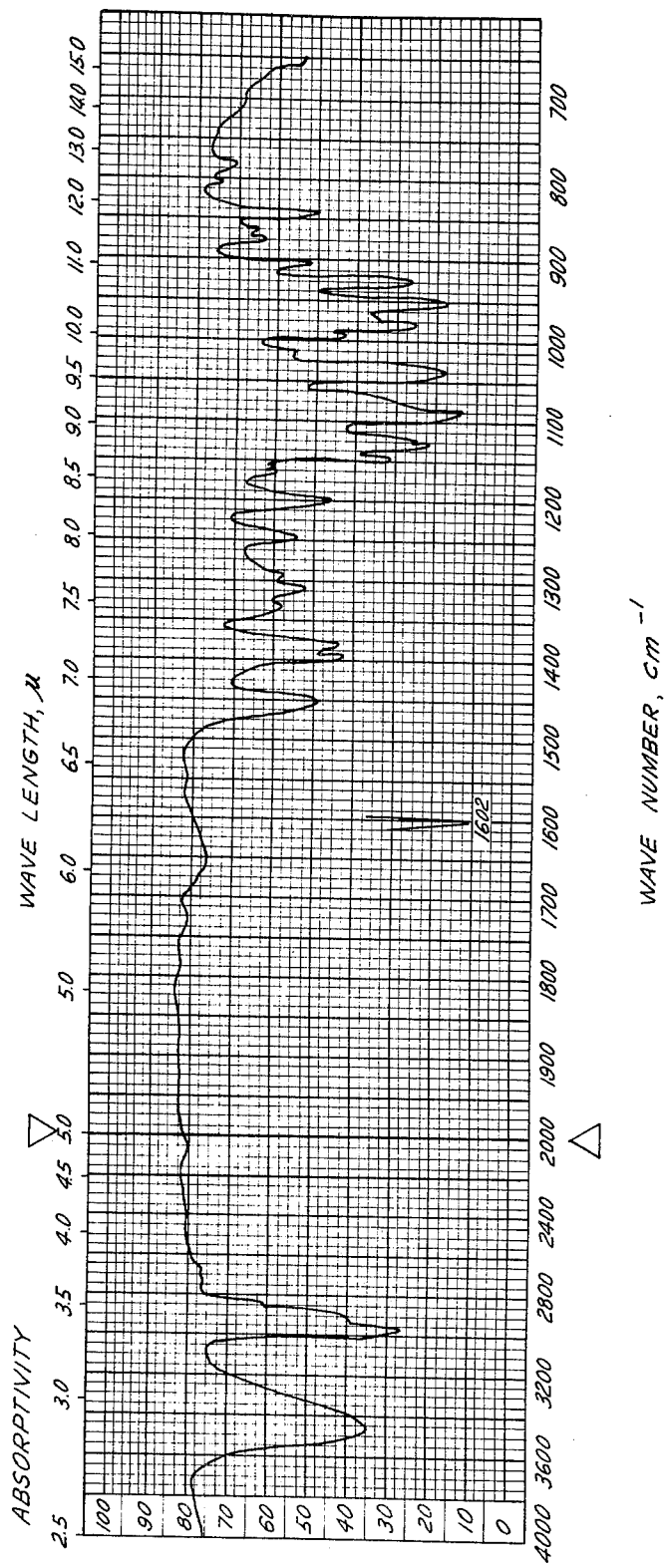
FIGS. 1, 2 and 3 are infrared spectra of the compounds obtained in Examples 3, 5 and 6, respectively.

The compounds of the invention are pharmaceutically important compounds which were discovered in the course of psychopharmacological and analytical blood research studies.

Preferably in the above formulae alkyl or alkoxy has 1 to 4 and acyl or acyloxy has 1 to 6 C atoms.

The synthesis of these compounds can proceed from cyclopenta(c)pyrans of the general formula II

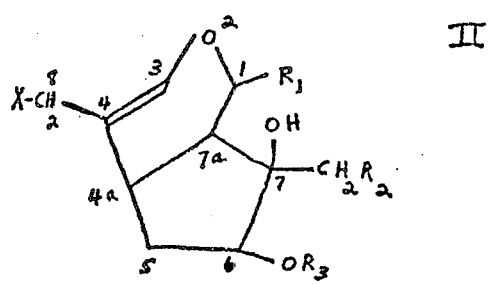
II wherein X is a group that can be eliminated, such as an acyloxy radical, preferably derived from acetic, iso valeric or iso caproic acid, $R_1$ is an acyloxy radical or a β-D-glucosido group, $R_2$ is a halogen atom a hydrogen atom or an -SCN radical and $R_3$ is a hydrogen atom or an acyl radical. Necessary conditions for cyclisation which can be performed in an acid, preferably an alcoholic medium, are firstly the cisoid position of the C-7 hydroxyl group and of the pyran ring on the cyclopentane ring and secondly the presence of the reactive allyl system at the C-atoms numbered C-3, C-4 and C-8. Cyclisation consists in the creation of a link between the hydroxyl oxygen at the C-7 atom and the C-3 atom with the simultaneous rearrangement of the allyl system and the elimination of HX. Since the reaction is performed in the presence of an alcohol and in the presence of an acid catalyst, such as hydrochloric acid, p-toluenesulphonic acid or a Lewis acid, the replacement of the $R_1$ group at the C-1 atom by an alkoxy or aralkoxy radical corresponding to the alcohol used can be effected by alcoholysis.

Compounds of formula II, wherein $R_1$ is an acyloxy radical and $R_2$ is a halogen atom or an -SCN, can be ontained from the didrovaltratum and its homologues and conversion of the epoxides into corresponding hydrins. In many cases it is possible to use the raw extracts of the substances as such for the preparation of the 2,9-dioxatricyclo-(4,3,1,0,$^{3,7}$)-decane.

The compounds of the above noted formula Ia, which result from this reaction are generally colourless, distillable oils or well crystallisable compounds of surprising stability. They are usually soluble in water and can be modified chemically. For instance, an acyloxy radical at the C-4 atom can be hydrolysed to the hydroxy group and at the same time a halomethyl radical at the C-3 atom can be catalytically reduced to a methyl, leading to compounds of the following formula III

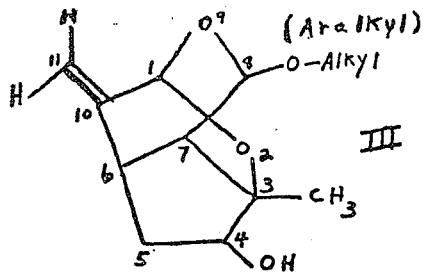

Compounds of formula III can also be obtained from the 1-β-D-glucosido-4-isovaleroxymethyl-6,7-dihydroxy-7-methyl-1,4a,5,6,7,7a-hexahydro-cyclopenta(c)pyran of the following formula IIa

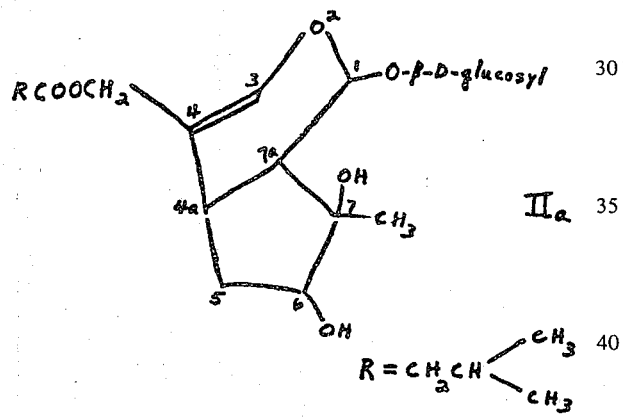

This glucoside is obtained by extraction of roots and rhizomes of Valeriana species with a polar solvent such as water, alcohol, acetone, ethyl acetate or a mixture of two or more thereof or a mixture of a halogenated hydrocarbon and an alcohol and by isolating the glucoside from the extract for instance by chromatography on silica gel or alumina using ethyl acetate with an addition of an alcohol. For the synthesis of the 2,9-dioxatricyclo-(4,3,1,0,$^{3,7}$)-decane of formula III the ester glucoside of formula IIa is reacted with an alcohol in the presence of a strong acid such as hydrohalic acid, a sulphonic acid or a Lewis acid. However it is not in all cases necessary to isolate the glucoside from the extract, but it is possible to use the raw extract as such for the synthesis. These compounds of formula III have an unmistakable central depressant effect on mice when administered per os in doses not exceeding 31.6 to 100 mg./kg. The LD$_{50}$ is at 600 to 2500 mg./kg. per os. This provides a very useful therapeutic range for the use of these substances.

Moreover, in compounds of the formula III the double bond between the C-10 and C-11 carbon atoms can be hydrogenated in conventional manner to provide compounds of the following formula IIIa.

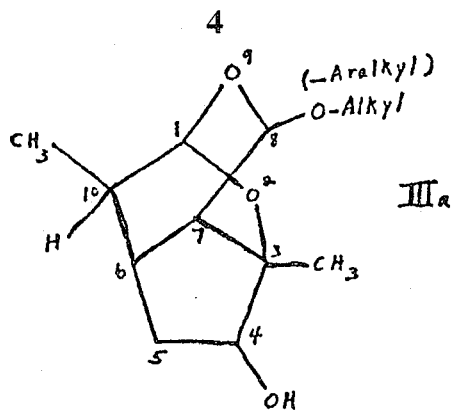

The same compounds can also be directly obtained from substances of formula Ia in which R$_1$ is an alkoxy or aralkoxy radical, R$_2$ is a halogen atom and R$_3$ is an acyl radical, by catalytically hydrogenating the compound in an alcohol and in the presence of a strong base, such as caustic soda or caustic potash, the preferred catalyst being Raney nickel.

After peroral administration in doses that are only fractions of the LD$_{50}$, these compounds have a surprisingly powerful dilating effect on arterial vessels and they are hypotensive and centrally depressant without reducing reflex excitability, contrary to, for instance, reserpine, which has a hypotensive effect but also reduces reflex excitability as an undesirable side effect.

The present substances can therefore be used for treating arteriosclerotic diseases and as a psychopharmaceutical. This constitutes a considerable step forward in the therapeutic art and particularly in geriatrics.

The alcohol group attached to the C$_4$ atom can be converted into a keto group by oxidation of compounds of the above formulae III and IIIa. There are thus formed the corresponding 2,9-dioxatricyclo-(4,3,1,0,$^{3,7}$)-decanone of the formula Ib

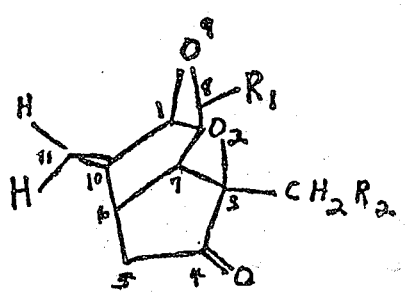

in which R$_1$ is alkoxy or aralkoxy and R$_2$ is hydrogen or halogen and in which the 10,11-position may also be hydrogenated. Preferably the oxidation is carried out at 0° to 50° C. The thus-obtained ketones likewise have a central depressant effect while also having a low toxicity. Besides, they have an analgesic effect. The central depressant effect is very clearly demonstrated by the significant prolongation of the evipan-narcosis after application of the compound.

The invention will now be illustrated by the following Examples:-

EXAMPLE 1:

The production of 4-acetoxy-3-halomethyl-(or thiocyanomethyl)-10-methylene-8-methoxy-2,9-dioxatricyclo-(4,3,1,0,$^{3,7}$)-decane

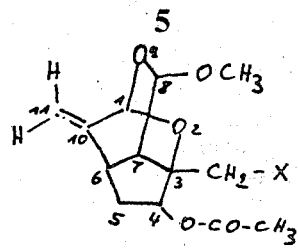

wherein X = I, -SCN, Br or Cl.

For the production of the 3-iodomethyl compound 6-Acetoxy-1,4a,5,6,7,7a-hexahydro-1-(isovaleroxy)-4-(isovaleroxymethyl)-cyclopenta(c)pyran-7-spiro-2-oxirane (didrovaltratum)

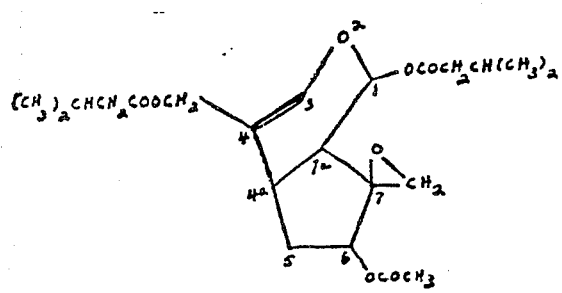

is converted in conventional manner to the corresponding hydrin with sodium iodide in glacial acetic acid/sodium acetate.

20 g. of the didrovaltratum iodohydrin thus obtained

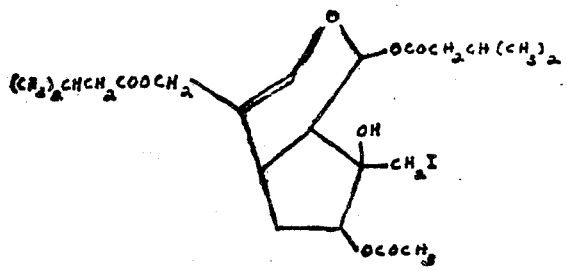

are dissolved in 25 ml. of methanol and then treated with a further 10 ml. of methanol containing 19 g. of HCl in solution, whilst externally cooling with ice. Gradually the solution assumes a dark greenish-blue colour. After having been allowed to stand for an hour at room temperature, it is diluted with water, exhaustively extracted with diethyl ether and the ether phase is neutralised with sodium bicarbonate. After drying over sodium sulphate, clarifying with a little charcoal and concentrating in a vacuum (at 7 mm. Hg and 50°C.) until the weight remains constant or until the odour of the methyl isovalerate disappears, 13.8 g. of a pale brown oil are obtained which, after having been taken up in a little methanol/ether slowly crystallises when kept standing in the cold.

The resultant 4-acetoxy-3-iodomethyl-10-methylene-8-methoxy-2,9-dioxatricyclo-(4,3,1,0,$^{3,7}$)-decane crystallizes in the form of white prisms and has the following characteristic physical data:-

$C_{13}H_{17}O_5I$    Mol. Wt.:380.19
　　　　　　　　　Mp:104 – 106°C.
　　　　　　　　　$[\alpha]_D^{20}$=+60° (in methanol).

From the corresponding didrovaltratum halohydrins prepared from didrovaltratum and sodium bromide or sodium chloride the following compounds were successfully prepared in analogous manner:-

4-Acetoxy-3-bromomethyl-10-methylene-8-methoxy-2,9-dioxatricyclo-(4,3,1,0,$^{3,7}$)-decane:-

$C_{13}H_{17}O_5Br$    Mol. Wt.:333.2
　　　　　　　　　Mp:101 – 102°C.
　　　　　　　　　$[\alpha]_D^{20}$=+80° (in methanol)

4-Acetoxy-3-chloromethyl-10-methylene-8-methoxy-2,9-dioxatricyclo-(4,3,1,0,$^{3,7}$)-deane:-

$C_{13}H_{17}O_5Cl$    Mol. Wt.:288.74
　　　　　　　　　Mp:90 – 91°C.
　　　　　　　　　$[\alpha]_D^{20}$=+80° (in methanol).

If didrovaltratum is reacted with potassium thiocyanide in acetic acid/sodium acetate, then didrovaltratum thiocyanohydrin, will form which can be cyclised by an analogous treatment with HCl in methanol to form 4-acetoxy-3-thiocyanomethyl-10-methylene-8-methoxy-2,9-dioxatricyclo-(4,3,1,0,$^{3,7}$)-decane that has the following characteristic physical data:-

$C_{14}H_{17}O_5HS$    Mol. Wt.:311.34
　　　　　　　　　Mp:118 – 120°C.
　　　　　　　　　$[\alpha]_D^{20}$=+46° (in methanol).

If the methanol is replaced by a different alcohol, such as ethanol, propanol, butanol or benzyl alcohol, the corresponding 4-acetoxy-3-halomethyl-10-methylene-8-alkoxy-(or aralkoxy)-2,9-dioxatricyclo-(4,3,1,0,$^{3,7}$)-decanes are obtained.

EXAMPLE 2

The production of 4-hydroxy-3-methyl-10-methylene-8-methoxy-2,9-dioxatricyclo-(4,3,1,0,$^{3,7}$)-decane of the formula III

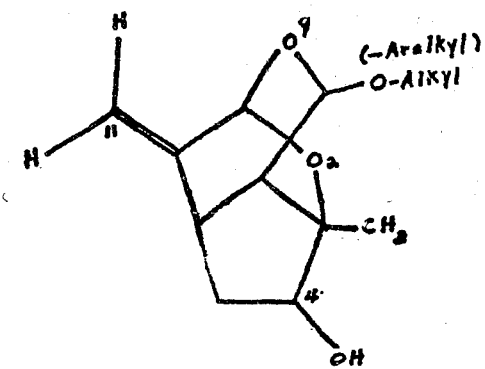

Alkyl=CH$_3$.

A solution of 0.7 g. of 4-acetoxy-3-iodomethyl-10-methylene-8-methoxy-2,9-dioxatricyclo-(4,3,1,0,$^{3,7}$)-decane, prepared as described in Example 1, in 20 ml. of methanol containing 0.5 ml. of diethylamine, is added to a suspension of 0.08 g. of Raney nickel in 20 ml. of methanol, and the mixture is hydrogenated by shaking at room temperature and atmospheric pressure with hydrogen. In the course of 90 minutes, one equivalent of hydrogen is consumed. After filtration through asbestos, the filtrate is concentrated until dry and the residue is extracted with chloroform.

After having been washed with water, dried over magnesium sulphate and concentrated in vacuo (at 7 mm. Hg at 50°C.), the chloroform extract yields 0.426 g. of 4-acetoxy-3-methyl-10-methylene-8-methoxy-2,9-dioxatricyclo-(4,3,1,0,$^{3,7}$)-decane in the form of a colourless oil, i.e. 90.5 percent of theory.

The oil is then dissolved in 25 ml. of methanol and 5 ml. of a 1N-solution of caustic soda are added to the solution. After having been allowed to stand for one hour at room temperature, the solution is diluted with water and extracted with ethyl acetate. After the ethyl acetate phase has been neutralised, dried over magnesium sulphate and concentrated in a vacuum (at 7 mm. Hg and 50°C.) it yields 0.292 g. of 4-hydroxy-3-methyl-10-methylene-8-methoxy-2,9-dioxatricyclo-(4,3,1,0,$^{3,7}$)-decane as a colourless oil:-

$C_{11}H_{16}O_4$     Mol. Wt.:212.25
              $[\alpha]_D^{20}=+42°$ (in methanol)
              $n_D^{20}=1.5096$

EXAMPLE 3

The production of 4-hydroxy-3,10-dimethyl-8-methoxy-2,9-dioxatricyclo-(4,3,1,0,$^{3,7}$)-decane from 4-acetoxy-3-iodomethyl-10-methylene-8-methoxy-2,9-dioxatricyclo-(4,3,1,0,$^{3,7}$)-decane.

3.8 g. of 4-acetoxy-3-iodomethyl-10-methylene-8-methoxy-2,9-dioxatricyclo-(4,3,1,0,$^{3,7}$)-decane are dissolved in 25 ml. of methanol which contains 0.85 g. of sodium hydroxide.

About 0.4 g. of Raney nickel moistened with methanol are suspended in 20 ml. of methanol and filled into a hydrogenating bulb. As soon as the catalyst is saturated with hydrogen, the solution of the substance is added to the catalyst suspension and hydrogenated with hydrogen under standard conditions (room temperature and 760 mm. Hg). In the course of 45 minutes, a total of 450 ml. of hydrogen are taken up.

The mixture is then filtered through asbestos and the filtrate concentrated in a vacuum (at 7 mm. Hg and 50°C.) until its weight remains constant. After having been taken up in water and salted out with ammonium sulphate, the solution is extracted with ether. The ether phase is dried over magnesium sulphate, filtered and concentrated until dry. 1.6825 g. of 4-hydroxy-3,10-dimethyl-8-methoxy-2,9-dioxatricyclo-(4,3,1,0,$^{3,7}$)-decane are obtained in the form of a colourless highly viscous oil, representing 78.9 percent of the theory.

Mol. Wt.:214.26
$[\alpha]_D^{21}=-12°$ (in methanol).

The compound is readily soluble in ether, alcohol and up to 2 percent in water. The IR-spectrum is reproduced in the accompanying drawing, FIG. 3.

If the starting substance is a compound which is substituted in the 8-position with an ethoxy, propoxy or butoxy group then the corresponding alkoxy compound is obtained.

EXAMPLE 4

The production of 4-hydroxy-3-methyl-10-methylene-8-alkoxy-2,9-dioxatricyclo-(4,3,1,0,$^{3,7}$)-decane by use of 1-β-D-glucosido-4-isovaleroxy-methyl-6,7-dihydroxy-7-methyl-1,4a,5,6,7,7a-hexahydro-cyclopenta(c)pyran.

The 1-β-D-glucosido-4-isovaleroxy-methyl-6,7-dihydroxy-7-methyl-1,4a,5,6,7,7a-hexahydro-cyclopenta(c)pyran is obtained as follows:

6 kg of ground roots and rhizomes of Valeriana Wallichii were first exhaustively percolated in a percolator with n-hexane and a 1 percent addition of acetic acid. This first percolate was discarded. A second percolation was then carried out with chloroform and methanol in the proportion of 5 : 2. The slightly concentrated percolate was washed three times, each time with 10 liters of water. The organic phase was discarded and the aqueous phase, having been saturated with ammonium sulphate, was extracted four times, each time with 5 liters of ethyl acetate. The ester phase was dried over magnesium sulfate and concentrated until dry. The total residue was 199 g, i.e. 3.31 percent related to the dried drug.

The fraction which primarily consisted of water-soluble ester glucosides was subjected to columnar chromatography for further purification:-

10 g of ethyl acetate residue were taken up in about 100 ml of damp ethyl acetate and, after having been allowed to stand for a while, any insoluble substances was filtered off. The filtrate was applied to a silica gel column that had been filled with 250 g of gel - grain size 0.2 to 0.5 mm. The suspension of the silica gel and the first elution were done with moist ethyl acetate, but later elution was continued with ethyl acetate containing an addition of methanol. Fractions of 100 ml were collected. The compound according to the invention, namely 1-β-D-glucosido-4-isovaleroxymethyl-6,7-dihydroxy-7-methyl-1,4a,5,6,7,7a-hexahydro-cyclopenta(c)pyran was present in the fractions numbered 17 to 27. From these fractions, after concentration, a total of 3.65 g of the glucoside were isolated in the form of an amorphous yellowish powder.

1 g β-D-glucosido-4-isovaleroxy-methyl-6,7-dihydroxy-7-methyl-1,4a,5,6,7,7a-hexahydro-cyclopenta(c)pyran was dissolved in 20 ml of an alkanol and 50 mg of p-toluenesulphonic acid were added to the solution. After briefly heating to 40° C, 60 ml of diluting water were added, the solution was neutralized with sodium bicarbonate and extracted with ethyl acetate. The entire extract was dried over sodium sulphate. After concentration in a vacuum, light brown oils were obtained which were purified by preparative thick layer chromatography on silica gel plates, the washing mixture consisting of 24 parts of ethyl acetate, 60 parts of n-hexane and 6 parts of n-propanol. (Larger quantities were purified by column chromatography on alumina with diethyl ether as the eluent or by vacuum distillation).

According to the alkanol used, the following compounds were produced:-

1. Using methanol:-
4-Hydroxy-3-methyl-10-methylene-8-methoxy-2,9-dioxatricyclo-(4,3,1,0,$^{3,7}$)-decane.

    Mol. Wt.:212.25
         $[\alpha]_D^{20}$:+42° (in methanol)
         $n_D^{20}$:1.5096

2. Using ethanol:-
4-Hydroxy-3-methyl-10-methylene-8-ethoxy-2,9-dioxatricyclo-(4,3,1,0,$^{3,7}$)-decane.

    Mol. Wt.:226.28
         $[\alpha]_D^{20}$:+55° (in water)
         $n_D^{20}$:1.4983

3. Using n-butanol:-
4-Hydroxy-3-methyl-10-methylene-8-(n-butoxy)-2,9-dioxatricyclo-(4,3,1,0,$^{3,7}$)-decane.

    Mol. Wt.:254.33
         $[\alpha]_D^{20}$:+39° (in methanol)
         $n_D^{20}$:1.4908

The substances obtained have a clearly marked central depressant effect when administered to mice per os in quantities as small as 31.6 - 100 mg./kg.. These effective doses are only about 1/20th of the measured $LD_{50}$.

By simple hydrogenation with palladium/active carbon, these compounds yield the corresponding 4-hydroxy-3,10-dimethyl-8-alkoxy-2,9-dioxatricyclo-(4,3,1,0,$^{3,7}$)-decanes that are hydrogenated in the 10, 11 positions.

EXAMPLE 5:

4.2 g of 4-hydroxy-3-methyl-10-methylene-8-methoxy-2,9-dioxatricyclo-(4,3,1,0,$^{3,7}$)-decane were dissolved in 100 ml acetone and reacted with 30 ml of a chromium trioxide solution while cooling the reaction mass. The chromium trioxide solution was formed as follows:

2.67 g $CrO_3$ (chromium trioxide) were dissolved in 10 ml concentrated $H_2SO_4$ and the solution was cautiously poured into 30 ml water and then brought up to a total volume of 50 ml by adding further amounts of water.

A few minutes after adding the chromium trioxide compound the mass was poured into ice water and extracted with chloroform. After drying of the chloroform phase over sodium sulphate and concentration in vacuo, there were obtained 3.2 g of 3-methyl-10-methylene-8-methoxy-2,9-dioxatricyclo-(4,3,1,0,$^{3,7}$)-decane-4-one (compound 5 of the table reproduced below). This was a yield of 77 percent of the theoretical yield.

After recrystallization from 90% methanol there were obtained white compact crystals having the following physical characteristics

Figure 2:
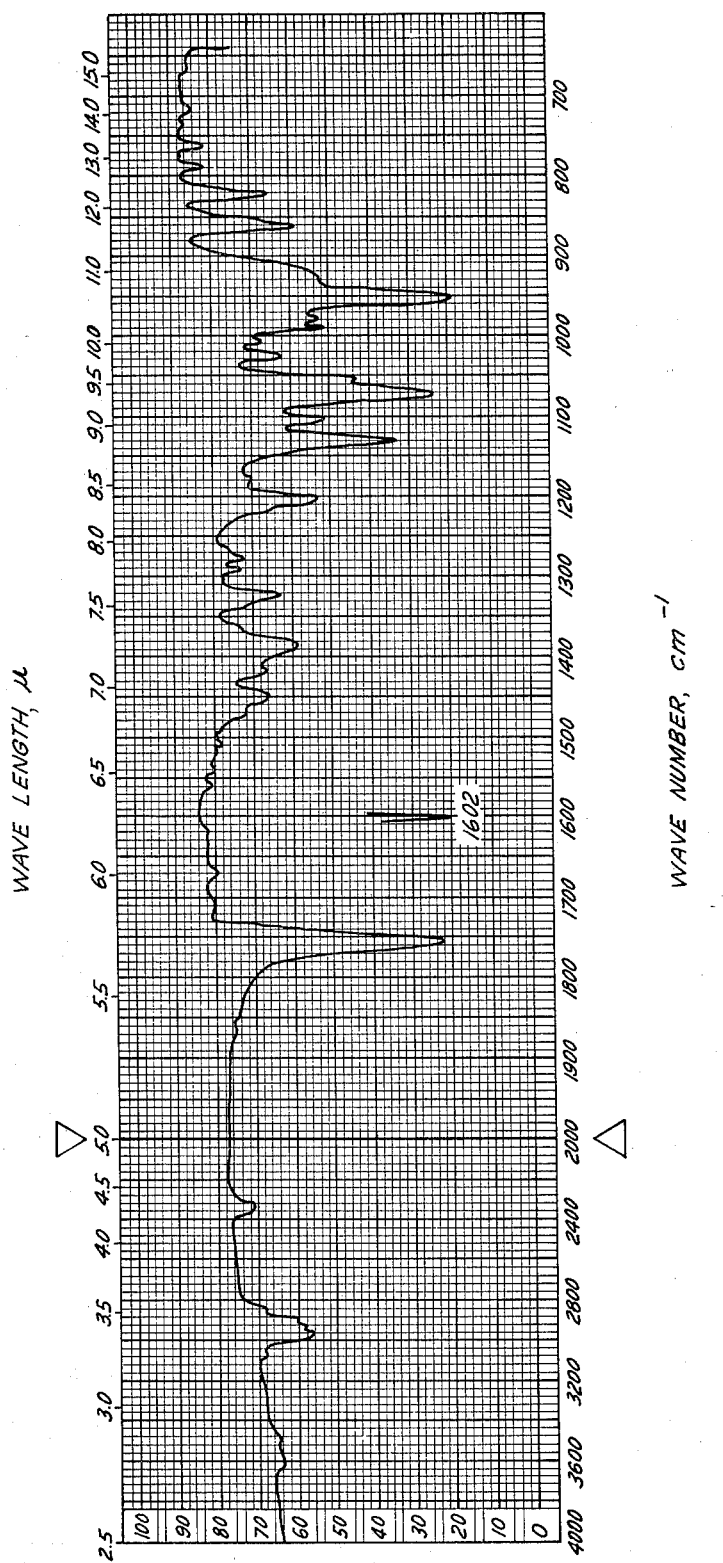

| | |
|---|---|
| empirical formula | $C_{11}H_{14}O_4$ |
| molecular weight | 210.73 |
| melting point | 86–88°C |
| optical rotation | $[\alpha]_D^{20}$:+23° in methanol |
| IR-spectrum | characteristic $\nu$-CO absorption peaks at 1745 cm$^{-1}$ (in KBr) as shown in FIG. 2 |
| solubility | highly soluble in alcohol, acetone, ether, chloroform, acetic acid ester and about at 2% in water. |

EXAMPLE 6:

9.6 g of 4-hydroxy-3,10-dimethyl-8-methoxy-2,9-dioxatricyclo-(4,3,1,0,$^{3,7}$)-decane were dissolved in 300 ml acetone and were oxidized by slow addition of the chromium trioxide solution described in Example 5. The reaction was carried out at room temperature while stirring. When it was complete the orange-brown color of the reagent no longer disappeared. The mass was then immediately poured into 700 ml ice water and the aqueous/alcoholic solution was extracted with chloroform. After drying of the chloroform phase over sodium sulfate and concentration in vacuo there were obtained 9.5 g 3,10-dimethyl-8-methoxy-2,9-dioxatricyclo-(4,3,1,0,$^{3,7}$)-decane-4-one in crystalline form (compound 6 of the table below). This was a yield of 100 percent of the theoretical yield.

Figure 3:
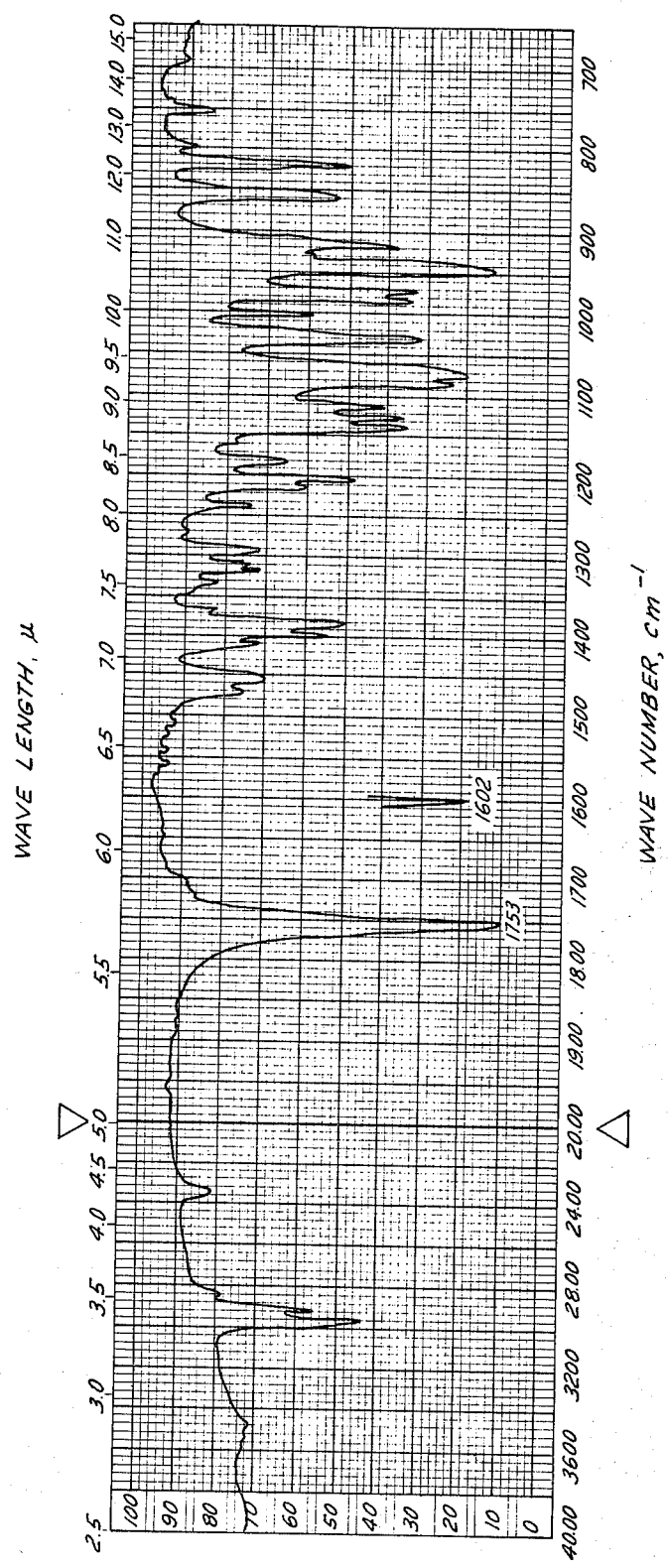

After recrystallization from 75 percent ethanol there were obtained 7.8 g of a material which proved entirely pure in analysis. The material was in the form of compact white crystals of the following characteristics:

| | |
|---|---|
| empirical formula | $C_{11}H_{16}O_4$ |
| molecular weight | 212.25 |
| melting point | 107–109°C |
| optical rotation | $[\alpha]_D^{20}$:-56° in methanol |
| IR-spectrum | characteristic $\nu$-CO absorption peaks at 1753 cm$^{-1}$ (in KBr), see FIG. 3 |
| solubility | highly soluble in alcohol, acetic acid ester, chloroform, acetone and at about 2% in water. |

EXAMPLES 7-10:

Additional 2,9-dioxatricyclo-(4,3,1,0,$^{3,7}$)-decane-4-one compounds were obtained by oxidation of the corresponding 2,9-dioxatricyclo-(4,3,1,0,$^{3,7}$)-decanols with chromium trioxide solution as described in Examples 5 and 6. In the following tables the compounds of Examples 5 and 6 together with these additional compounds are identified and their properties are listed.

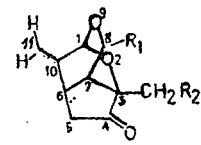

| Example | $R_1$ | $R_2$ | $(\alpha)_D^{20}$ MeOH | m.p.°C | Empirical formula |
|---|---|---|---|---|---|
| 5 | $OCH_3$ | H | + 23° | 86 – 88 | $C_{11}H_{14}O_4$ |

-continued

| Example | $R_1$ | $R_2$ | | $(\alpha)_D^{20}$ MeOH | m.p.°C | Empirical formula |
|---|---|---|---|---|---|---|
| 6 | 10,11-position hydrogenial | $OCH_3$ | H | $-56°$ | 107 – 108 | $C_{11}H_{16}O_4$ |
| 7 | " | $OC_2H_5$ | H | $-50°$ | 61 – 62 | $C_{12}H_{18}O_4$ |
| 8 | " | $OC_4H_9$ | H | $-56°$ | 42 – 43 | $C_{14}H_{22}O_4$ |
| 9 | " | $OCH_2C_6H_5$ | H | $-77°$ | 77 – 79 | $C_{17}H_{20}O_4$ |
| 10 | " | $OCH_3$ | Cl | $-48°$ | 01 | $C_{11}H_{15}O_4Cl$ |

A pharmaceutical composition incorporating the compounds of the invention as the active ingredients can be formed in conventional manner by using conventional carrier materials which are inert to the active components. The carrier materials may, for instance, be water, a pharmaceutically acceptable vegetable oil, gelatin, lactose, a polyethyleneglycol, starch, magnesium stearate, talcum, etc.

For the parenteral application solutions, preferably oily or aqueous solutions may best be used. However, the compounds can also be applied in suspensions or emulsions.

For the enteral application, tablets, capsules or lozenges may be used which may contain the usual additives, for instance preservatives, stabilizers or wetting agents. The compounds may be applied by mouth or by subcutaneous or intravenous injection. For human patients, the preferred single dose for application per os is between 10 and 100 mg. In the case of animals, the dose may be higher.

The $LD_{50}$ determined by application by mouth to white mice as test materials was 600 to 2500 mg/kg. Of particular interest is that the i.v. toxicity of the water-soluble compounds in the case of the white mice was found to be at an $LD_{50}$ of 500 mg/kg.

Regarding the hypotensive action, this was determined by noting the dilation of the arterial vessels and the consequent increase of the peripheral flow in tests with cats and dogs. For instance, with non-anaesthetized dogs, a clearly noticeable lowering of the blood pressure occurred already at a dose of 21.5 mg/kg administered per os. The lowering of the blood pressure developed during the first hour and persisted for several hours.

The central depressant effect has been established by the fact that a substantial lengthening of the evipan anaesthesia occurred after administration of the compounds.

In experiments with white mice in a dosage of 31.6 mg/kg per os of the compound of Example 6 above, a marked lowering of the spontaneous activity was found to prevail for a time up to one hour after application of the drug. The $LD_{50}$ in this case was found to be 2150 mg/kg.

The same dose which caused reduction of the activity produced an analgesic effect (Writhing Test), which was stronger than that of 100 mg acetyl salicylic acid. Similar observations were obtained with the compounds of Examples 7 and 8.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by letters patent is set forth in the appended:

1. A compound of the group consisting of 2,9-dioxatricyclo[4.3.1.0$^{3,7}$]decan-4-ones having the formulae

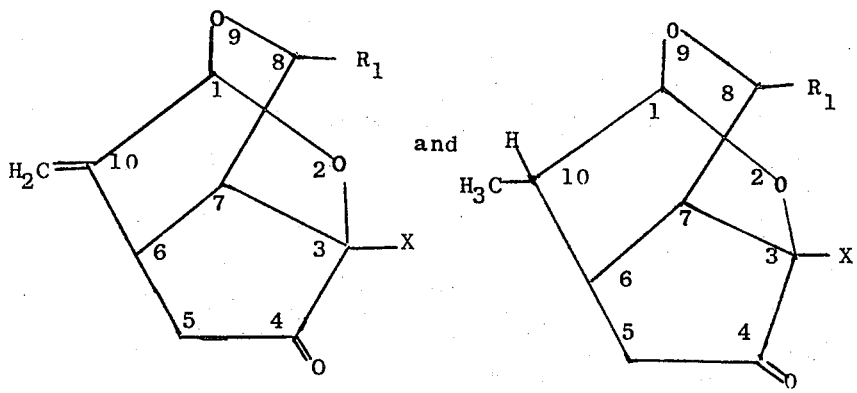

in each of which formulae $R_1$ is a radical of the group consisting of alkoxy radicals having up to 4 carbon atoms and the benzyloxy radical, and X is a radical of the group consisting of methyl and chloromethyl radicals.

2. A compound as defined in claim 1 which is 3-methyl-10-methylene-8-methoxy-2,9-dioxatricyclo[4.3.1.0$^{3,7}$]decan-4-one.

3. A compound as defined in claim 1 which is 3,10-dimethyl-8-methoxy-2,9-dioxatricyclo[4.3.1.0$^{3,7}$]decan-4-one.

4. A compound as defined in claim 1 which is 3,10-dimethyl-8-ethoxy-2,9-dioxatricyclo[4.3.1.0$^{3,7}$]decan-4-one.

5. A compound as defined in claim 1 which is 3,10-dimethyl-8-butoxy-2,9-dioxatricyclo[4.3.1.0$^{3,7}$]decan-4-one.

6. A compound as defined in claim 1 which is 3,10-dimethyl-8-benzyloxy-2,9-dioxatricyclo[4.3.1.0$^{3,7}$]decan-4-one.

7. A compound as defined in claim 1 which is 3-chloromethyl-10-methyl-8-methoxy-2,9-dioxatricyclo[4.3.1.0$^{3,7}$]decan-4-one.

* * * * *